Figure 1:
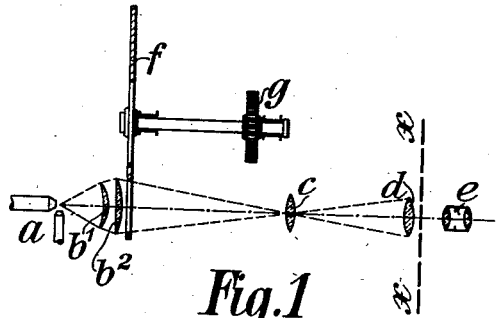

J. LEHMANN.
CINEMATOGRAPHIC APPARATUS.
APPLICATION FILED APR. 22, 1913.

1,399,567.

Patented Dec. 6, 1921.

Witnesses:

Inventor:
Johannes Lehmann

UNITED STATES PATENT OFFICE.

JOHANNES LEHMANN, OF JENA, GERMANY, ASSIGNOR TO THE FIRM OF CARL ZEISS, OF JENA, GERMANY.

CINEMATOGRAPHIC APPARATUS.

1,399,567. Specification of Letters Patent. Patented Dec. 6, 1921.

Application filed April 22, 1913. Serial No. 762,932.

(GRANTED UNDER THE PROVISIONS OF THE ACT OF MARCH 3, 1921, 41 STAT. L., 1313.)

*To all whom it may concern:*

Be it known that I, JOHANNES LEHMANN, a citizen of the German Empire, residing at Jena, Germany, have invented a new and useful Cinematographic Apparatus, (for which I have filed an application in Germany Oct. 25, 1912,) of which the following is a specification.

The present invention relates to the presenting of colored, cinematographic pictures according to that method, in which two, three or more pictures in suitable simple colors are superposed. When such pictures are being presented, it is necessary for each picture to be projected with the same color, with which it was originally exposed. When it is not desired to color the single film-pictures themselves, each with its appropriate color, or to let a film provided with corresponding color-fields run through in contact with the film carrying the pictures, a movable color-filter having the chosen number of simple colors is, as is well known, introduced at some distance from the film-band into the path of the rays, the motion of this filter corresponding to that of the film-band. As, however, with this arrangement the color-filter must for constructive reasons be at a certain distance from the film-band, in those cases, in which, as for instance in the apparatus with a continuously moving film-band and optical compensation of the wandering of the picture, a separating line between two contiguous color-fields or several such lines are projected, the colored ray pencils necessarily overlap at their edges on the film-band; hence at the edges of the pictures there result disturbing faults in the coloring, unless sufficiently wide, blank stripes are interpolated between the separate pictures, an arrangement, which, however, does not allow of the film-surface being used to the best advantage. This drawback is removed according to the invention by an image of the color-filter being imaged formed with the aid of an optical system on the plane of the film whereby a sharp delimitation of the color-fields relatively to one another may be obtained on the film-band. The color fields can be arranged for instance on a rotatable cylindrical or conical surface or on a film-band.

In the simplest form of a cinematographic apparatus on the lines of the present invention, the color-filter is adjacent to a condenser system, by which an image of the source of light used in the apparatus is formed at the locus of a collective system, or in its immediate vicinity by which latter system an image of the color-filter is formed on the plane of the film. When it is desired to keep the color-filter farther away from the source of light, for instance with the object of removing the filter from the heating action of the source of light, a second condenser system along with a second collective system may be introduced between the source of light and the first-named condenser system by which second condenser system an image of the source of light is formed at the locus of the second collective system or in its immediate vicinity, while an image of the said second condenser system itself is formed by the latter in the condenser system, which is adjacent to the color-filter.

Figure 2:
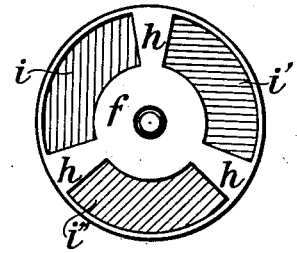
Figure 3:
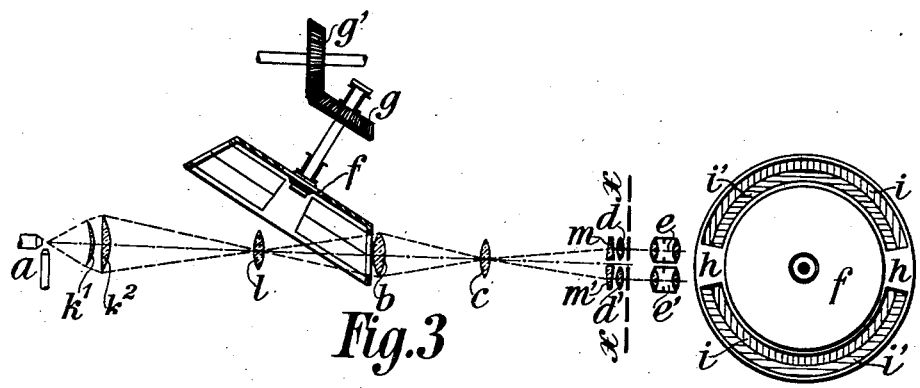
Figure 4:
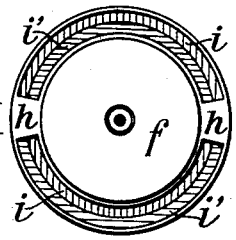
Figure 5:
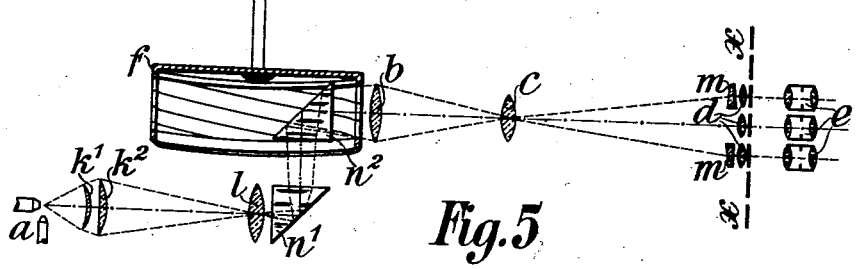
Figure 6:
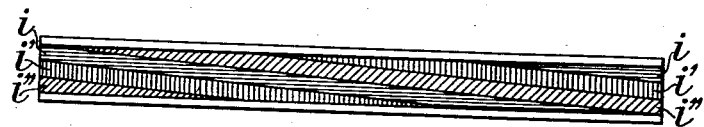

In the annexed drawing three examples are shown of the various possible ways of carrying out the invention. Figures 1 and 2 refer to a cinematographic apparatus for three simple colors, the apparatus having one objective and being adapted to project the pictures rapidly in succession, Fig. 1 being a diagrammatic section of the apparatus perpendicular to the direction of travel of the film-band and Fig. 2 a view of the color-filter. Figs. 3 and 4 show diagrammatically as a second example a cinematographic apparatus for two simple colors, in which apparatus two pictures are simultaneously projected each by a separate objective, Fig. 3 representing a longitudinal section of the apparatus and Fig. 4 a plan view of the color-filter. Figs. 5 and 6 represent diagrammatically as a third example an apparatus for three simple colors, in which apparatus three pictures are brought into coincidence on the screen by means of three objectives respectively, Fig. 5 being a longitudinal section of the apparatus and Fig. 6 a development of the color-filter surface.

In Fig. 1 $a$ denotes a source of light, $b^1$, $b^2$ a condenser system, while $c$ represents a collective system and $d$ a condenser system, which in the present instance are both assumed to be simple lenses. The condenser $b^1$, $b^2$ forms at the locus of the collective lens $c$ an image of the source of light, of which image an image is formed by the auxiliary condenser lens $d$ in the entrance pupil of the projection-objective $e$. An image of the color-filter $f$ is formed by the collective lens $c$ on the film-surface $x\ x$, the lens $d$ thereby being practically without effect, because it lies in close proximity of the image plane. The color-filter is in the present instance constructed as a rotatable plane disk and is rotated in correspondence with the motion of the film by means of a positive motion-transmission, which is indicated in Fig. 1 by the toothed wheel $g$. The motion of the film-band is assumed to be a continuous one with optical compensation of the wandering of the picture, so that, as shown in Fig. 2, the separate color surfaces of the filter are contiguous to one another.

In the second example, Fig. 3 $a$ again denotes the source of light, $b$ a condenser lens, $c$ a collective lens and $d$ and $d'$ a pair of auxiliary condenser lenses, which fulfil the same duty as the corresponding parts in the first example. The image of the color-filter $f$ formed by the collective lens $c$ is practically not affected by the lenses $b$, $d$ and $d'$, because the lens $b$ lies in close proximity of the color-filter and the lenses $d$ and $d'$ lie in close proximity of the image-plane. In order to increase the distance of the color-filter $f$ from the source of light $a$, there are added in this example a condenser system $k^1$, $k^2$ and a collective lens $l$, of which $k^1$, $k^2$ forms an image of the source of light at the locus of $l$, while $l$ forms an image of the system $k^1$, $k^2$ in the condenser $b$. As with color-filters for the simultaneous projection of several pictures in different colors a rotatable, plane disk does not admit of a rectilinear, rectangular limiting of the separate light-pencils, as is required with the usual form of film-pictures, the filter-fields, in order to avoid this defect, are in the present instance disposed on a rotatable, conical, convex surface, which is likewise rotated, corresponding to the motion of the film-band, by means of a positive transmission of motion indicated in Fig. 3 by the bevel wheels $g$ and $g'$. In Fig. 4 $i$ and $i'$ are the filter-fields, while, under the assumption of an intermittent motion of the film, between them obscuring spaces $h$ are again provided. In order to be able, when simultaneously using several objectives, to properly illuminate the different pictures with a single source of light, the refracting prisms $m$ and $m'$ are introduced into the path of the rays of the illuminating cone.

In the third example, Fig. 5 the optical systems $b$, $c$, $d$, $e$, $k$, $l$ and $m$ are similar to those in Fig. 3. The color-fields are in this example fitted to a cylindrical surface, which is rotatable about a somewhat inclined axis, this arrangement necessitating in the arrangement shown the interposition of the reflecting prisms $n^1$ and $n^2$. The motion of the filter-drum is again effected positively corresponding to the motion of the film-band, this being indicated in the drawing by the bevel gear wheels $g$, $g'$. The color-filter has in this case a cylindrical surface, in which the color-fields, under the assumption of a continuous film-band motion, are contiguous to each other in spirals without any interspersed obscuring spaces.

I claim:

1. In a cinematographic apparatus an objective system, a source of light, a film adapted to travel through the path of the rays coming from the source of light, a color-filter containing a plurality of colors and rotatably disposed in the said path of rays and optical means adapted to form an image of the said color-filter in the plane, in which the said film travels.

2. In a cinematographic apparatus an objective system, a source of light, a film adapted to travel through the path of the rays coming from the source of light, a color-filter containing a plurality of colors and rotatably disposed in the said path of rays, a condenser system adjacent to the said color-filter, a collective system adapted to form an image of the said color-filter in the plane, in which the said film travels, a second condenser system disposed in front of the said condenser system, a second collective system disposed between the two condenser systems, the said second condenser sytem being adapted to image the source of light at the locus of the said second collective system and being itself adapted to have an image formed of it by the said second collective system in the condenser system, which is adjacent to the color filter.

JOHANNES LEHMANN.

Witnesses:
PAUL KRÜGER,
RICHARD HAHN.